US012272930B2

(12) United States Patent
Ritter

(10) Patent No.: US 12,272,930 B2
(45) Date of Patent: Apr. 8, 2025

(54) METHOD FOR PRODUCING A SPARK PLUG, AND SPARK PLUG

(71) Applicant: Robert Bosch GmbH, Stuttgart (DE)

(72) Inventor: Ronald Ritter, Notzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/688,447

(22) PCT Filed: Jul. 26, 2022

(86) PCT No.: PCT/EP2022/071011
§ 371 (c)(1),
(2) Date: Mar. 1, 2024

(87) PCT Pub. No.: WO2023/030766
PCT Pub. Date: Mar. 9, 2023

(65) Prior Publication Data

US 2024/0388068 A1 Nov. 21, 2024

(30) Foreign Application Priority Data

Sep. 6, 2021 (DE) ..................... 10 2021 209 797.9

(51) Int. Cl.
*H01T 13/46* (2006.01)
*H01T 13/39* (2006.01)
*H01T 21/02* (2006.01)

(52) U.S. Cl.
CPC ............. *H01T 13/39* (2013.01); *H01T 13/46* (2013.01); *H01T 13/467* (2013.01); *H01T 21/02* (2013.01)

(58) Field of Classification Search
CPC ........ H01T 13/46; H01T 13/467; H01T 21/02
(Continued)

(56) References Cited

U.S. PATENT DOCUMENTS 5,369,328 A * 11/1994 Gruber .................... H01T 13/39 313/140
2002/0055318 A1* 5/2002 Ishiguro .................. H01T 21/02 445/7
(Continued)

FOREIGN PATENT DOCUMENTS

| | | | |
|---|---|---|---|
| EP | 2621037 | A2 | 7/2013 |
| EP | 2621038 | A2 | 7/2013 |
| WO | 2020025184 | A1 | 2/2020 |

OTHER PUBLICATIONS

International Search Report for PCT/EP2022/071011, Issued Jan. 23, 2023.

*Primary Examiner* — Christopher M Raabe
(74) *Attorney, Agent, or Firm* — NORTON ROSE FULBRIGHT US LLP; Gerard A. Messina

(57) ABSTRACT

A method for producing a spark plug including a spark plug electrode assembly having a center electrode and a ground electrode surrounding the center electrode. The spark plug electrode assembly is formed from a one-piece spark plug electrode base body made of spark plug electrode material, and the ground electrode and the center electrode are connected to one another by a connecting region, wherein the center electrode and an inner surface of the ground electrode are polygonal. The method includes: a) connecting the spark plug electrode assembly to a spark plug base body, and b) removing the connecting region between the ground electrode and the center electrode.

13 Claims, 3 Drawing Sheets

(58) Field of Classification Search
USPC .......................................................... 313/141
See application file for complete search history.

(56) References Cited

U.S. PATENT DOCUMENTS

| | | | | |
|---|---|---|---|---|
| 2012/0299459 | A1* | 11/2012 | Sakakura | H01T 13/54 445/3 |
| 2013/0187530 | A1* | 7/2013 | Desalvo | H01T 13/467 313/142 |
| 2015/0028737 | A1* | 1/2015 | Alfonso | H01T 13/54 313/125 |
| 2015/0031263 | A1 | 1/2015 | Farrell et al. | |

* cited by examiner

METHOD FOR PRODUCING A SPARK PLUG, AND SPARK PLUG

FIELD

The present invention relates to a method for producing a spark plug and to a spark plug having improved spark formation.

BACKGROUND INFORMATION

During the production of spark plugs, the center electrode provided for this purpose and the ground electrode are produced separately from one another and installed in succession. This means that the center electrode is connected to an electrical connection region and the ground electrode is usually connected to the housing of the spark plug. Due to this separate production and arrangement of the electrodes, adjusting a precise distance between the electrodes, which is critical to efficient and permanently good ignition spark formation, is difficult. In addition, in order to achieve permanently good spark formation and thus a permanently high engine power, the wear surfaces on the electrodes must be as large as possible. For this purpose, curved geometries of the electrodes can be used, which, however, have to be produced in a complicated manner and thus with high costs and are also not suitable for all electrode materials.

SUMMARY

A method having features of the present invention provides a cost-effective and easily implementable method for producing a spark plug having an exactly predefined distance between the ground electrode and the center electrode, wherein the center electrode and the ground electrode have large wear surfaces.

According to an example embodiment of the present invention, in the method, a spark plug electrode assembly having a center electrode and a ground electrode surrounding the center electrode is used. The spark plug electrode assembly is formed from a one-piece spark plug electrode base body made of spark plug electrode material. Furthermore, the ground electrode and the center electrode are connected to one another by a connecting region.

The spark plug electrode base body is not limited in any way and can have any shape and layer thickness that are suitable for forming at least one ground electrode, at least one center electrode, and a connecting region.

Likewise, the spark plug electrode material is also substantially not limited. Nickel has proven to be particularly suitable as the base material since nickel is characterized by high temperature resistance, oxidation resistance, and wear resistance. The spark plug electrode material thus advantageously comprises at least 50 mass % nickel. Particularly advantageously, the spark plug electrode material consists of a nickel-chromium alloy or a nickel-yttrium alloy.

According to an example embodiment of the present invention, the ground electrode, the center electrode, and the connecting region can be produced by different methods, these methods forming the above components of the spark plug electrode assembly in one piece and thus from a contiguous material. Such a method can comprise forming the ground electrode, the center electrode, and the connecting region by removing spark plug electrode material from the spark plug electrode base body. This can be carried out technically very simply and in a short amount of time and makes it possible to precisely form the components of the spark plug electrode assembly in terms of geometry and shape.

Any suitable method can in principle be used to remove the spark plug electrode material from the spark plug electrode base body. Removal by punching or ablating or eroding or lasering is particularly simple, cost-effective and precise. Used individually or in combination, these methods are therefore particularly advantageous.

According to an example embodiment of the present invention, alternatively or additionally, deep-drawing at least one region of the spark plug electrode base body can also be used. Individual partial regions can thereby be reshaped selectively by deep-drawing and thus obtain the desired shape.

According to an example embodiment of the present invention, as an alternative or in addition to removing spark plug electrode material from the spark plug electrode base body, the ground electrode, the center electrode, and the connecting region connecting the ground electrode and the center electrode can be formed in one piece by building up spark plug electrode material. For this purpose, the spark plug electrode material can, for example, be deposited on a suitable support in such a way that the ground electrode, the center electrode, and the connecting region are formed in one piece and thus contiguously. The support is removed after completion of the one-piece spark plug electrode assembly. Suitable methods for building up material, such as CVD or PVD, are described in the related art. The advantage here is furthermore that a three-dimensional spark plug electrode assembly can be obtained by the material build-up without further shaping steps. This makes it possible to save time and costs for the production of the spark plug electrode assembly.

According to an example embodiment of the present invention, a further method according to which the spark plug electrode assembly can be produced is advantageously building up spark plug electrode material by 3D printing. The shape and design of the spark plug electrode assembly can in this case be defined in advance by means of a CAD method so that a dimensionally accurate build-up of the spark plug electrode assembly can be controlled in a targeted manner.

The spark plug electrode assembly used according to the present invention having a ground electrode and a center electrode also comprises spark plug electrode assemblies having a plurality of ground electrodes and/or a plurality of center electrodes.

According to an example embodiment of the present invention, the center electrode and an inner surface of the ground electrode are polygonal. This has the advantage that the electrodes have a relatively simple geometric shape and can therefore be produced very simply, precisely and thus also cost-effectively. The electrode distance can thereby also be adjusted more precisely. In addition, the polygonal design of the electrodes results in a large wear surface between the electrodes and very good flow properties, which can be optimized in a targeted manner to the spark plug and its application requirements.

The ground electrode and the center electrode are initially connected to one another, i.e., before the intended use of the spark plug, by a connecting region, which is formed between the ground electrode and the center electrode. The connecting region stabilizes the distance between the ground electrode and the center electrode. The electrode distance thus does not result afterwards by arranging the electrodes on a spark plug base body, but rather already in advance due to the formation of the spark plug electrode assembly. For this purpose, the ground electrode, the center electrode, and the connecting region are formed from the one-piece spark plug electrode base body made of spark plug electrode material. The ground electrode, the center electrode, and the connecting region are thus formed in one piece and contiguously. In other words, this means that the distance between the electrodes results from the component geometry of the spark plug electrode assembly rather than by separately arranging the electrodes during the assembly of the spark plug. As a result, the electrode distance of all center electrodes and all ground electrodes, and thus all spark gaps, is formed precisely and uniformly without high technical effort.

By way of example, the connecting region can be designed in the form of at least one web, which connects the ground electrode and the center electrode to one another. Having a small geometric extent, a web offers a very good option for stabilizing the distance between the ground electrode and the center electrode and can be realized simply both by removing spark plug electrode material from the spark plug electrode base body and by building up the spark plug electrode material.

Due to the improvement in the stabilization of the distance between the ground electrode and the center electrode, the connecting region can comprise two to four webs, which connect the ground electrode and the center electrode to one another. The higher the number of webs is, the more stably the electrode distance can be adjusted.

In order to develop the spark plug electrode assembly into a spark plug, the method according to an example embodiment of the present invention provides a step of connecting the spark plug electrode assembly to a spark plug base body and, furthermore, a step of removing the connecting region between the ground electrode and the center electrode.

The spark plug base body may comprise a housing, an electrical connection region for the center electrode, and an insulator. Since details of spark plug base bodies are already understood by the person skilled in the art, corresponding further explanations can be dispensed with here.

A permanently good arrangement of the electrodes without the possibility of generating electrical short circuits can advantageously be realized in that the ground electrode is connected to a housing of the spark plug and/or the center electrode is connected to an electrical connection for the center electrode. As a result, the electrodes are also permanently stably fastened to the spark plug base body, which is conducive to the mechanical stability of the spark plug to be produced.

In this case, the connection preferably takes place in a firmly bonded manner, wherein the method for firmly bonding is not limited in any way. Particularly advantageously, due to forming the connection in a very good and stable manner, the connection can be carried out by means of laser welding, by means of resistance welding, or by means of hard-soldering.

In order to avoid electrical short circuits between the ground electrode and the center electrode, the method according to an example embodiment of the present invention comprises, as explained above, a step of removing the connecting region between the ground electrode and the center electrode. The removal can, for example, be carried out by milling, ablating, eroding, or by treating with a laser. The removal of the connecting region is in particular carried out such that no material residues of the connecting region protrude from the ground electrode or the center electrode so that the spark gap between the electrodes is not impaired. The respective surfaces of the center electrode and of the ground electrode are thus flat.

By means of the method according to the present invention for producing a spark plug, a spark plug having a permanently high power density and very good flow properties can be produced cost-effectively and with little technical effort due to large wear surfaces and precisely adjusted electrode distance.

Preferred developments of the present invention are disclosed herein.

According to an example embodiment of the present invention, in order to improve the flow properties with simultaneously very simple and cost-effective production, the center electrode and the inner surface of the ground electrode are preferably at least triangular.

In this case, the center electrode and the inner surface of the ground electrode are particularly advantageously respectively triangular or respectively quadrangular. This results in either three spark gaps or four spark gaps between the electrodes, which has proven to be very advantageous in light of permanently good spark formation.

According to a further advantageous development of the present invention, the method comprises a step of attaching small noble metal plates to the connection surfaces between two corners so that the small noble metal plates on the center electrode are opposite the small noble metal plates on the ground electrode at least in portions and preferably completely. In this case, small noble metal plates can be arranged in particular on all connection surfaces between two corners of the center electrode, which facilitates the formation of ignition sparks. In order to further improve spark formation, corresponding small noble metal plates on the ground electrode are in each case opposite the small noble metal plates of the center electrode, wherein spark gaps exist between the corresponding small noble metal plates of the center electrode and of the ground electrode. The small noble metal plates in particular have a flat shape so that they can be arranged very well on the likewise flat connection surfaces between two corners. Forming the connection between the small noble metal plates and the connection surfaces is thus simplified, which results in a permanently stable arrangement of the small noble metal plates.

In this case, the connecting region can be removed up to the surface of the respective small noble metal plate in order not to produce any notches or recesses in the noble metal, which can lead to misfiring. The opposite surfaces of the small noble metal plates are thus planar.

According to an example embodiment of the present invention, preferably, the connecting region is removed in such a way that the connecting region present between the small noble metal plates is also at least partially removed. This leads at least to the formation of exposed corners on the respective small noble metal plate, at which corners are present field enhancements in the electric field so that the ignition voltage requirement for the ignition spark formation is reduced. The connecting region can in particular also be completely removed between two adjacent small noble metal plates.

According to an example embodiment of the present invention, particularly preferably in light of simplified production and processing of the small noble metal plates, the small noble metal plates of the center electrode have the same geometric shape as the small noble metal plates of the ground electrode. With a corresponding arrangement of the small noble metal plates on the ground electrode and the center electrode, this results in the respective small noble metal plate pairs overlapping completely, which is conducive to ignition spark formation. The small noble metal plates are particularly advantageously designed in the shape of rectangles since they can be attached very well to the planar connection surfaces between two corners of the center electrode and of the ground electrode and have large wear surfaces.

In order to further improve spark formation, it is advantageously provided that the small noble metal plates are arranged such that they substantially completely cover the connection surfaces between two corners. The connecting region in the spark plug electrode assembly used is thus very narrow at the electrodes so that the noble metal content on the electrode surface is maximal. This ensures a permanently high power of the spark plug to be produced and prevents misfiring of the fuel gases.

According to an example embodiment of the present invention, the method for producing a spark plug can furthermore advantageously comprise a step of providing openings in the ground electrode and/or in the center electrode, wherein the openings serve to better distribute the reaction gases and exhaust gases.

Furthermore, the present invention also provides a spark plug, which comprises a ground electrode and a center electrode, wherein the ground electrode surrounds the center electrode, wherein an inner surface of the ground electrode and the center electrode are polygonal, wherein small noble metal plates are arranged on the connection surfaces between two corners of the ground electrode and of the center electrode, wherein a spark gap is formed between a small noble metal plate of the ground electrode and a small noble metal plate of the center electrode, and wherein the corners of the center electrode comprise small noble metal plate-free regions.

These small noble metal plate-free regions result from the fact that the spark plug can be produced as described above by the method according to the present invention for producing a spark plug. As explained in the description of this method, a spark plug electrode assembly in which the ground electrode and the center electrode are connected to one another by a connecting region is used in this case. Since the small noble metal plates are attached then, i.e., only afterwards, after the electrodes and the connecting region have been formed, the partial regions of the ground electrode or of the center electrode which have the connecting region cannot comprise any small noble metal plates. Depending on the number of webs removed in the course of the method for producing the spark plug, which webs form the connecting region between the ground electrode and the center electrode, a corresponding number of small noble metal plate-free regions thus results on the ground electrode or the center electrode. These regions can have the same spark plug electrode material from which the spark plug electrode base body, which comprises the ground electrode, the center electrode, and the connecting region, is also formed. Preferably, the connecting region has been removed in such a way that the connecting region arranged between two small noble metal plates has also at least partially been removed. This leads to exposed regions between adjacent small noble metal plates and corners resulting therefrom on the respective small noble metal plate, at which corners are present field enhancements in the electric field so that the ignition voltage requirement for the ignition spark formation is reduced.

The spark plug according to the present invention can accordingly be produced in particular by the above-described method according to the present invention for producing a spark plug so that the same advantageous effects result for the spark plug according to the present invention and a spark plug having precisely adjusted electrode distance, and thus defined spark gap, having large wear surfaces results, which are essential for a long service life at high power density of the spark plug. The respective developments of the aspects according to the present invention are also used mutually.

According to an example embodiment of the present invention, particularly advantageous flow geometries are obtained if the center electrode and the inner surface of the ground electrode are respectively at least triangular and in particular respectively triangular or respectively quadrangular. These geometries are also easy to produce and characterized by good mechanical stability.

Further advantageously, according to an example embodiment of the present invention, the center electrode and the inner surface of the ground electrode have the same number of corners. If each connection surface connecting two corners comprises a small noble metal plate, this also results in the same number of small noble metal plates on the ground electrode and the center electrode. In order to improve spark formation, the small noble metal plates cover the connection surfaces between two corners substantially completely, whereby the wear surface is also maximized.

In order to further promote stable ignition spark formation, the small noble metal plates of the center electrode preferably have the same geometric shape as the small noble metal plates of the ground electrode. With a corresponding opposite arrangement of the small noble metal plates on the ground electrode and on the center electrode, this results in a particularly large wear surface and advantageously formed spark gap. In addition, the costs for the production of the spark plug are reduced due to the reduced effort for producing the spark plug.

According to a particularly preferred embodiment of the present invention, the center electrode is triangular. It thus comprises three corners and three side surfaces connecting the corners and is in particular formed in the shape of an equilateral triangle. On its three side surfaces is arranged a respective small noble metal plate, wherein the corners in particular comprise small noble metal plate-free regions. In contrast, the inner surface of the ground electrode is hexagonal, in particular in the shape of an equilateral hexagon. On the three side surfaces of the hexagon that are opposite the side surfaces of the center electrode, a respective small noble metal plate is arranged so that the small noble metal plates of the center electrode are opposite the small noble metal plates of the ground electrode. The further three side surfaces of the ground electrode are substantially small noble metal plate-free regions. Particularly advantageously, the small noble metal plates of the center electrode and the small noble metal plates of the ground electrode have the same geometric shape and are congruent. The geometric shapes of the ground electrode, the center electrode and the small noble metal plates result in three identical spark gaps having an identical electrode distance so that the ignition spark formation is uniformly good for a long time. The specific triangular design of the center electrode and the hexagonal design of the inner surface of the ground electrode also result in a further advantage: The flow properties of the combustion gases are improved so that a particularly uniform distribution of the fuel gases between the electrodes results, as a result of which the combustion of the fuel gases at the electrodes is also more uniform. This promotes a permanently high power density of the spark plug. Due to the very large wear surfaces of the electrodes, the service life of the spark plug is increased in comparison to conventional spark plugs.

Likewise advantageously, according to an example embodiment of the present invention, the center electrode is quadrangular and thus comprises four side surfaces and corners between the side surfaces. On its four side surfaces is arranged a respective small noble metal plate so that the center electrode comprises four small noble metal plates, which are respectively aligned in different directions. The center electrode is particularly advantageously square, which has proven to be advantageous both with regard to the flow properties and the combustion of the combustion gases. The inner surface of the ground electrode is octagonal and this octagon surrounds the center electrode uniformly. On four side surfaces of the eight-sided octagon is arranged a respective small noble metal plate. The small noble metal plates of the ground electrode are arranged on the side surfaces of the octagon that are opposite the side surfaces of the center electrode that are provided with small noble metal plates, so that the small noble metal plates of the center electrode are opposite the small noble metal plates of the ground electrode. The further four side surfaces of the ground electrode are substantially small noble metal plate-free regions and are between the side surfaces having small noble metal plates, namely, opposite the small noble metal plate-free corners of the center electrode. This results in four uniformly formed spark gaps having very good flow properties of the fuel gases due to the geometries of the center electrode and of the inner surface of the ground electrode so that uniform and good combustion is promoted. The wear surfaces are also large so that the service life of the spark plug is improved.

Due to the high wear resistance with very good spark formation property, the small noble metal plates preferably comprise iridium, wherein the content of iridium is at least 60 mass %, based on the total mass of the small noble metal plate. In particular, all small noble metal plates have the same composition. In combination with the formation of the center electrode and of the ground electrode in the form of polygons, the use of iridium as the main metal in the small noble metal plates has still a further unexpected advantageous effect: The use of high iridium contents in the small noble metal plates leads to difficult-to-bend small noble metal plates, which mechanically destabilize in response to deformation, i.e., bending or curving, so that small plates in the shape of rectangles are preferred for stability reasons.

In order to improve wear resistance, the small noble metal plates furthermore comprise rhodium and/or rhenium.

BRIEF DESCRIPTION OF THE DRAWINGS

Exemplary embodiments of the present invention are described in detail below with reference to the figures.

DETAILED DESCRIPTION OF EXAMPLE EMBODIMENTS

Only the main details of the present invention are shown in the figures. All other details are omitted for the sake of clarity. In addition, identical reference signs refer to identical components.

Figure 1:
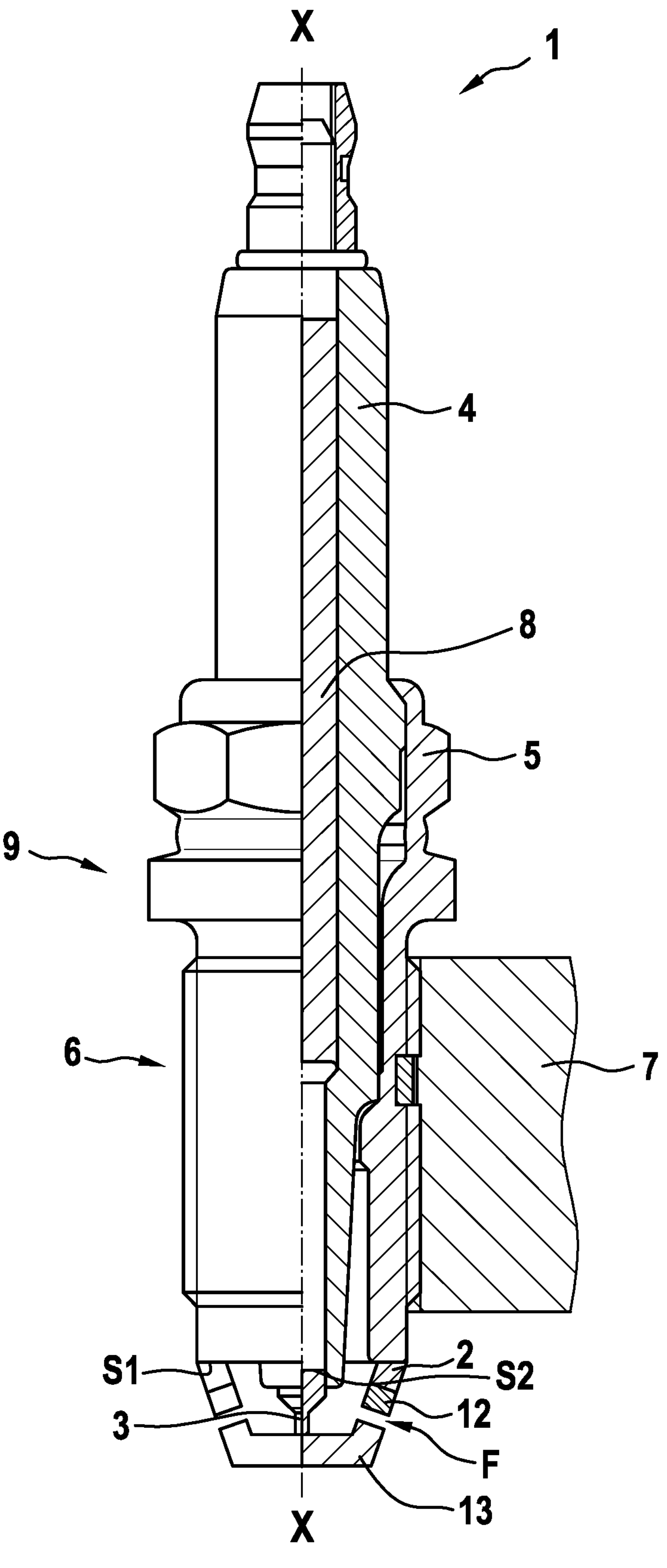
FIG. 1 is a partial sectional view of a spark plug according to a first example embodiment of the present invention.

As can be seen in FIG. 1, the spark plug 1 comprises a ground electrode 2, a center electrode 3, and an insulator 4. A housing 5 at least partially surrounds the insulator 4. A thread 6, which is designed for fastening the spark plug 1 in a cylinder head 7, is arranged on the housing 5. In order to generate an ignition spark, the center electrode 3 is connected to an electrical connection 8.

In the spark plug 1 of FIG. 1, the ground electrode 2 and the center electrode 3 are formed from the same material, namely, in such a way that the ground electrode 2 and the center electrode 3 were initially formed, connected to one another by a connecting region, from a one-piece spark plug electrode base body made of spark plug electrode material, for example by deep-drawing of the spark plug electrode base body.

Small noble metal plates were arranged on the polygonal ground electrode 2 and on the likewise polygonal center electrode 3, wherein a spark gap F is formed between the small noble metal plates of the ground electrode 2 and the small noble metal plates of the center electrode 3.

In a further step, the spark plug electrode base body was connected to a spark plug base body 9, which, as shown here, comprises the housing 5, the insulator 4, and the electrical connection 8.

As shown here, the ground electrode 2 is preferably connected to the housing 5 by a first welded connection S1, and the center electrode 3 is advantageously connected to the electrical connection 8 by a second welded connection S2. The connecting region, which was initially formed between the ground electrode 2 and the center electrode 3, was removed for the initial operation of the spark plug 1.

Due to the fact that the ground electrode 2 and the center electrode 3 and the small noble metal plates correspondingly arranged thereon were produced by forming a connecting region between the ground electrode 2 and the center electrode 3, the electrode distance between the small noble metal plates of the ground electrode 2 and the small noble metal plates of the center electrode 3 is permanently stable and very precisely adjusted to a predetermined distance in the spark plug 1 shown in FIG. 1. In addition, due to the polygonal design of the ground electrode 2 and the center electrode 3, the wear surfaces are increased. The spark plug 1 is consequently characterized by a high power density and a low spark-erosion wear with a simple and cost-effective production method.

Figure 2:
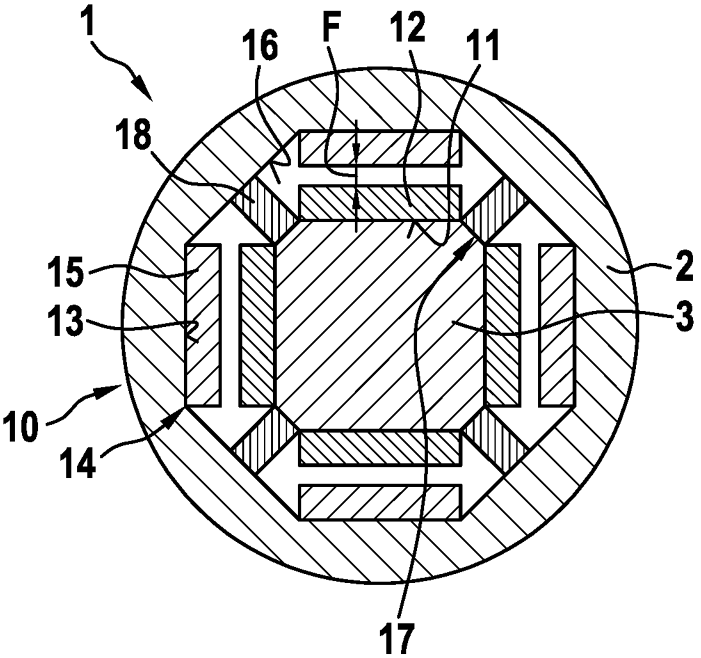
FIG. 2 is a partial view of a spark plug before initial operation, according to a second example embodiment of the present invention in section.

FIG. 2 shows a partial view of a spark plug 1 having a spark plug electrode assembly 10 before initial operation, according to a second embodiment in section.

The spark plug 1 comprises a ground electrode 2 and a center electrode 3, both of which are polygonal. The ground electrode 2 surrounds the center electrode 3 on all sides.

The center electrode 3 is quadrangular and, on its four side surfaces 11, comprises a respective small noble metal plate 12. A side surface 11 represents a connection surface between two corners 17. Since the center electrode 3 comprises four side surfaces 11, the center electrode 3 also has four small noble metal plates 12 and four corners 17. The small noble metal plates 12 are identical in shape and dimension.

The inner surface of the ground electrode 2 is octagonal, having eight side surfaces 13, 16 and eight corners 14. The side surfaces 13, 16 serve as connection surfaces between two corners 14. Small noble metal plates 15 are arranged on four of the eight side surfaces 13, 16 so that, twice in the octagon, two small noble metal plates 15 are opposite one another. The small noble metal plates 12 of the center electrode 3 are also opposite the small noble metal plates 15 of the ground electrode 2. The presence of corners 14 (and also corners 17) has the advantage that field enhancements are present in the electric field at the corners 14 (17) so that the ignition voltage requirement for the ignition spark formation is reduced.

All small noble metal plates 12, 15 used not only have the same geometry and dimension but are also formed from the same material, namely, they comprise iridium, wherein the content of iridium is at least 60 mass %, based on the total mass of a small noble metal plate. In addition, rhodium and/or rhenium can be contained as alloying elements. Rectangular small noble metal plates, as shown in this embodiment, can very well be produced having high mechanical stability from the corrosion-stable iridium and installed.

The further four side surfaces 16 of the ground electrode 2, which do not comprise small noble metal plates 15, are substantially small noble metal plate-free regions. The small noble metal plate-free regions, i.e., the four side surfaces 16 of the ground electrode 2, are opposite the four corners 17 of the center electrode 3.

In the spark plug electrode assembly 10, the noble metal-free regions of the ground electrode 2 are connected to the corners 17 of the center electrode by connecting regions 18. The connecting regions 18 result from the one-piece production of a spark plug electrode assembly 10 used for the production of the spark plug 1. As a result, a precise defined electrode distance is already adjusted during the production of the electrodes 2, 3, which results in a uniform spark gap after the small noble metal plates 12, 15 have been arranged. This improves the service life of the spark plug 1 at high power density.

In the embodiment shown here, all small noble metal plates are of identical design, thus have the same geometry and dimension. A permanently good spark generation can thus take place with low spark-erosion wear of the electrodes. In addition, the production of the spark plug is thereby facilitated.

Due to the design of the ground electrode 2 having an octagonal inner surface and of the center electrode 3 having a quadrilateral shape, very good flow properties are achieved in the combustion chamber between the electrodes 2, 3, and the fuel gases are brought to combustion particularly uniformly, which further improves the service life of the spark plug 1.

Figure 3:
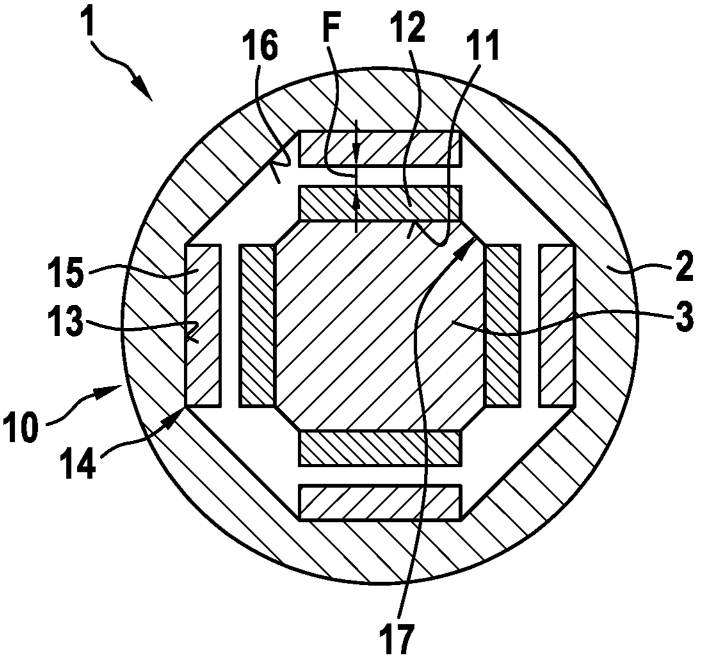
FIG. 3 is a partial view of the spark plug of FIG. 2 during initial operation, in section.

FIG. 3 shows the same partial view of the spark plug 1 according to the second embodiment as shown in FIG. 2, but now during initial operation of the spark plug 1. This means that the previously present connecting region 18, consisting of webs, between the ground electrode 2 and the center electrode 3 was removed in order to electrically separate the electrodes. The small noble metal plate-free corners 17 of the quadrilateral center electrode 3 are exposed and opposite the small noble metal plate-free side surfaces 16 of the octagonal ground electrode 2. The fuel gases can now pass uniformly into a region between the electrodes 2, 3 so that particularly uniform ignition spark formation is promoted. In addition, the corners 14 and also corners 17 are exposed so that field enhancements are present in the electric field at the corners 14, 17 and the ignition voltage requirement for the ignition spark formation is reduced.

Figure 4:
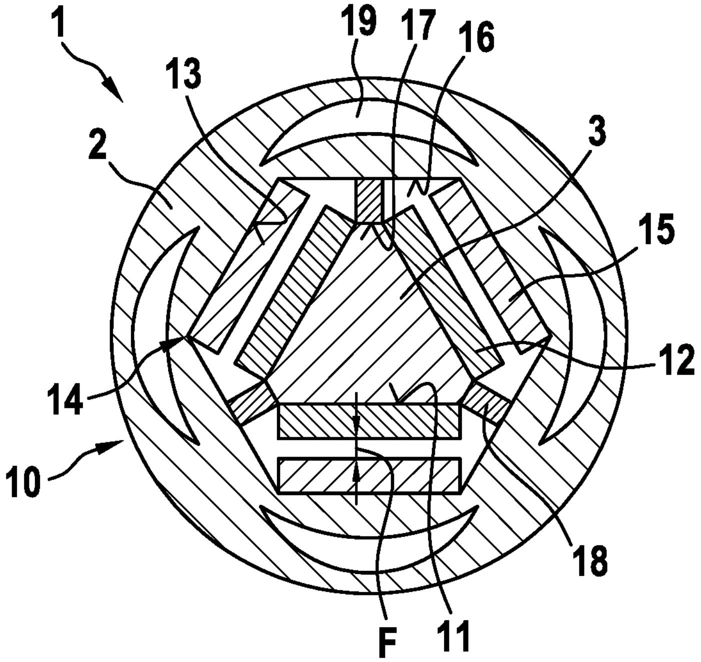
FIG. 4 is a partial view of a spark plug before initial operation, according to a third example embodiment of the present invention in section.

FIG. 4 shows a partial view of a spark plug 1 having a spark plug electrode assembly 10 before initial operation, according to a third embodiment in section.

The spark plug 1 shown in FIG. 4 differs from that of FIG. 2 in that the center electrode 3 is triangular, i.e., is formed having three side surfaces 11 and three corners 17. The inner surface of the ground electrode 2 is hexagonal, having six side surfaces 13, 16 and six corners 14.

Three side surfaces 13 of the six side surfaces 13, 16 of the ground electrode 2 comprise small noble metal plates 15, which are arranged on side surfaces 13, which connect two corners 14 of the inner surface of the ground electrode 2. The three side surfaces 16 of the inner surface of the ground electrode 2 do not comprise any small noble metal plates and are substantially small noble metal plate-free regions. These substantially small noble metal plate-free regions of the inner surface of the ground electrode 2 in turn are opposite the corners 17 of the center electrode 3.

The spark plug 1 is not yet configured for start of operation, since the electrodes 2, 3 are still electrically connected to one another by a connecting region 18 in the form of three webs.

Reference sign 19 denotes openings, more precisely gas exchange openings or overflow bores, which make purposeful flushing of the so-called breathing space of the spark plug 1 possible so that combusted waste gases are flushed out and fresh fuel gas is introduced into the breathing space and into the spark gap F, which improves the ignition properties of the spark plug 1.

The embodiment shown here is characterized by particularly good fuel gas flow conditions. The fuel gases pass into the spark gap F on all sides around the center electrode 3 in order to generate an ignition spark and ignite the fuel. The spark plug 1 is characterized by very large wear surfaces of the electrodes so that the service life of the spark plug 1 is increased with very simple and cost-effective producibility. Since the spark plug 1 in this embodiment was also produced using a one-piece spark plug electrode assembly, the electrode distance 2, 3 is already predetermined at the time of the electrode production and is particularly precise so that the spark gap F is uniform in all regions after attaching the small noble metal plates.

Figure 5:
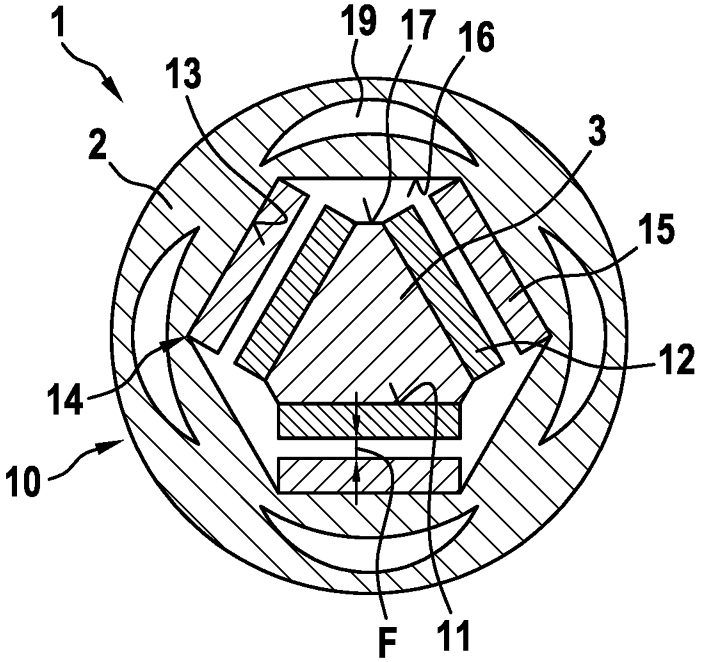
FIG. 5 is a partial view of the spark plug of FIG. 4 during initial operation, in section.

FIG. 5 shows the same partial view of the spark plug 1 according to the third embodiment as shown in FIG. 4, but now during initial operation of the spark plug 1. This means that the previously present connecting region 18, consisting of webs, between the ground electrode 2 and the center electrode 3 was removed in order to electrically separate the electrodes. The small noble metal plate-free corners 17 of the triangular center electrode 3 are exposed and opposite the small noble metal plate-free side surfaces 16 of the hexagonal ground electrode 2. Here, the fuel gases can pass particularly uniformly into a region between the electrodes 2, 3 so that particularly good ignition spark formation is promoted.

The invention claimed is:

1. A method for producing a spark plug, the spark plug including a spark plug electrode assembly having a center electrode and a ground electrode surrounding the center electrode, the method comprising the following steps:

forming the spark plug electrode assembly from a one-piece spark plug electrode base body made of spark plug electrode material, and the ground electrode and the center electrode being connected to one another by a connecting region, and wherein the center electrode and an inner surface of the ground electrode are polygonal;

connecting the spark plug electrode assembly to a spark plug base body; and removing the connecting region between the ground electrode and the center electrode, wherein the center electrode is quadrangular, and an inner surface of the ground electrode is octagonal.

2. The method according to claim 1, wherein the center electrode and the inner surface of the ground electrode are at least triangular.

3. The method according to claim 1, wherein the center electrode and the inner surface of the ground electrode are respectively triangular or respectively quadrangular.

4. The method according to claim 1, further comprising:

attaching small noble metal plates to connection surfaces between two corners of the center electrode and the ground electrode so that the small noble metal plates on the center electrode are opposite the small noble metal plates on the ground electrode at least in portions.

5. The method according to claim 4, wherein the small noble metal plates of the center electrode have the same geometric shape as the small noble metal plates of the ground electrode.

6. The method according to claim 4, wherein the small noble metal plates are arranged such that they substantially completely cover the connection surfaces between the two corners.

7. A spark plug, comprising:

a ground electrode;

a center electrode, wherein the ground electrode surrounds the center electrode, and wherein the center electrode and an inner surface of the ground electrode are polygonal; and small noble metal plates arranged on connection surfaces of the between two corners of the ground electrode and the center electrode, wherein a spark gap is formed between a small noble metal plate of the ground electrode and a small noble metal plate of the center electrode;

wherein the corners of the center electrode include small noble metal plate-free regions, wherein the center electrode is quadrangular, and an inner surface of the ground electrode is octagonal.

8. The spark plug according to claim 7, wherein the center electrode and the inner surface of the ground electrode are respectively triangular or respectively quadrangular.

9. The spark plug according to claim 7, wherein the small noble metal plates of the center electrode have the same geometric shape as the small noble metal plates of the ground electrode.

10. The spark plug according to claim 7, wherein the center electrode is triangular and includes a respective small noble metal plate on each of its three side surfaces, wherein the inner surface of the ground electrode is hexagonal and includes a respective small noble metal plate on each of three side surfaces so that the small noble metal plates of the center electrode are opposite the small noble metal plates of the ground electrode, wherein further three side surfaces of the ground electrode are substantially small noble metal plate-free regions.

11. The spark plug according to claim 7, wherein the center electrode is quadrangular and includes a respective small noble metal plate on each of its four side surfaces, wherein the inner surface of the ground electrode is octagonal and includes a respective small noble metal plate on each of four side surfaces so that the small noble metal plates of the center electrode are opposite the small noble metal plates of the ground electrode, wherein further four side surfaces of the ground electrode are substantially small noble metal plate-free regions.

12. The spark plug according to claim 7, wherein each of the small noble metal plates include iridium, wherein a content of the iridium is at least 60 mass %, based on a total mass of the small noble metal plate.

13. The spark plug according to claim 12, wherein the small noble metal plates further include rhodium and/or rhenium.

* * * * *